United States Patent Office 3,060,208
Patented Oct. 23, 1962

3,060,208
METHOD OF PREPARING 16,17-DISUBSTITUTED-4-PREGNENES
John P. Dusza, Nanuet, and Seymour Bernstein, New City, N.Y., assignors to American Cyanamid Company, New York, N.Y., a corporation of Maine
No Drawing. Filed July 7, 1961, Ser. No. 122,412
5 Claims. (Cl. 260—397.45)

This invention relates to steroid esters. More particularly, it relates to a method of preparing mono and diesters of steroids of the pregnane series.

The preparation of 21-mono esters or 16,21 mixed esters of steroids having the 16α,17α,21-trihydroxy moiety has, in the past, presented a problem. This was because of the fact that any esterification of this type steroid gave primarily 16α,21-diesterification with small amounts of the 16α-ester and the 21-ester. Separation and purification of the 21-mono ester has been difficult, costly and time consuming.

We have now found desirable esters, particularly, 21-mono esters, 16α mono esters and 16α,21-mixed esters can be prepared readily from steroid orthoesters. The process of the present invention is capable of preparing steroids having the formula:

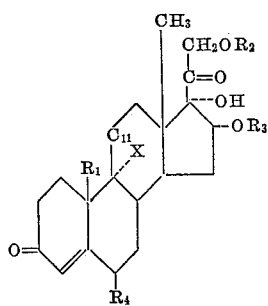

wherein $R_1$ is selected from the group consisting of hydrogen and methyl groups, $R_2$ is selected from the group consisting of hydrogen and lower alkanoyl radicals, $R_3$ is selected from the group consisting of hydrogen, formyl and lower alkanoyl radicals and not more than one of the groups $R_2$ and $R_3$ representing hydrogen, $C_{11}$ is selected from the group consisting of the divalent radicals

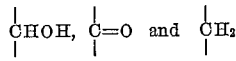

and X is selected from the group consisting of hydrogen and halogen atoms.

The compounds illustrated above are prepared by reacting a steroid having the formula:

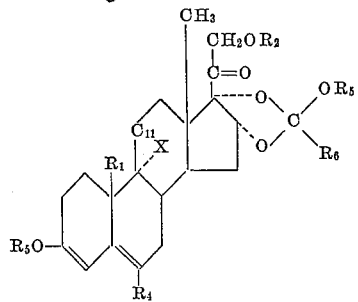

wherein $R_1$, $R_2$, $R_4$, $C_{11}$ and X are as defined hereinbefore, $R_6$ is selected from the group consisting of hydrogen and lower alkyl radicals and $R_5$ is a lower alkyl radical with at least two equivalents of a strong acid in the presence of solvents inert to the reactants. The reaction takes place rapidly and is complete within a period of from five to ten minutes.

In carrying out the process of the present invention, strong acids such as sulfuric and hydrochloric acids can be used. Also, acids such as p-toluenesulfonic acid monohydrate or perchloric have been found useful. In the process, solvents such as dioxane or tetrahydrofuran or mixtures of such with methylene chloride, chloroform and so forth can be used.

When one equivalent of a strong acid is used and the time limited to less than five minutes, partial hydrolysis takes place wherein the 3-lower alkyloxy $\Delta^{3,5}$-steroid is hydrolyzed to a 3-keto $\Delta^4$-steroid leaving the 16α,17α-substituted methylenedioxy structure intact.

The process of the present invention and compounds prepared by the process can be illustrated by the following flowsheet.

FLOWSHEET

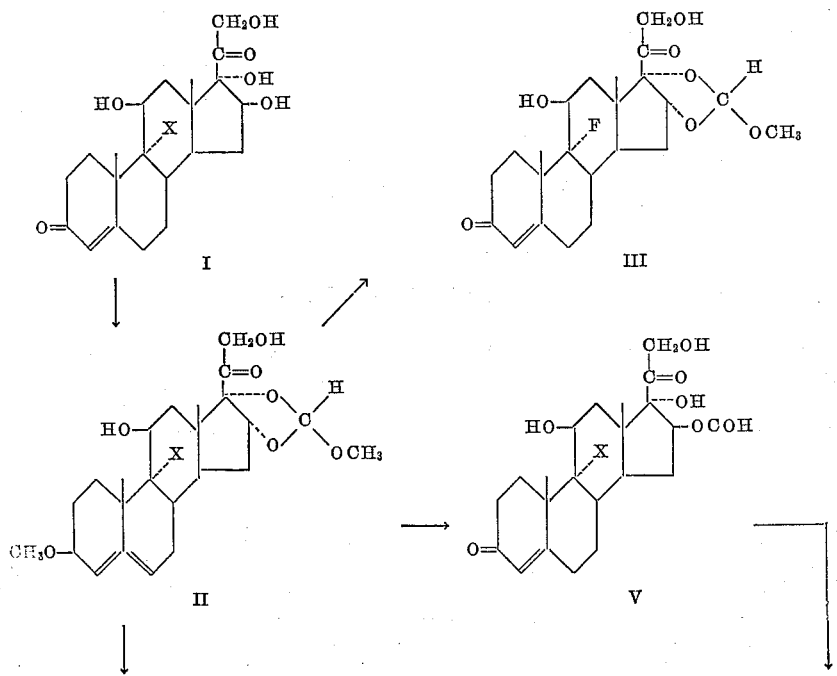

FLOWSHEET—Continued

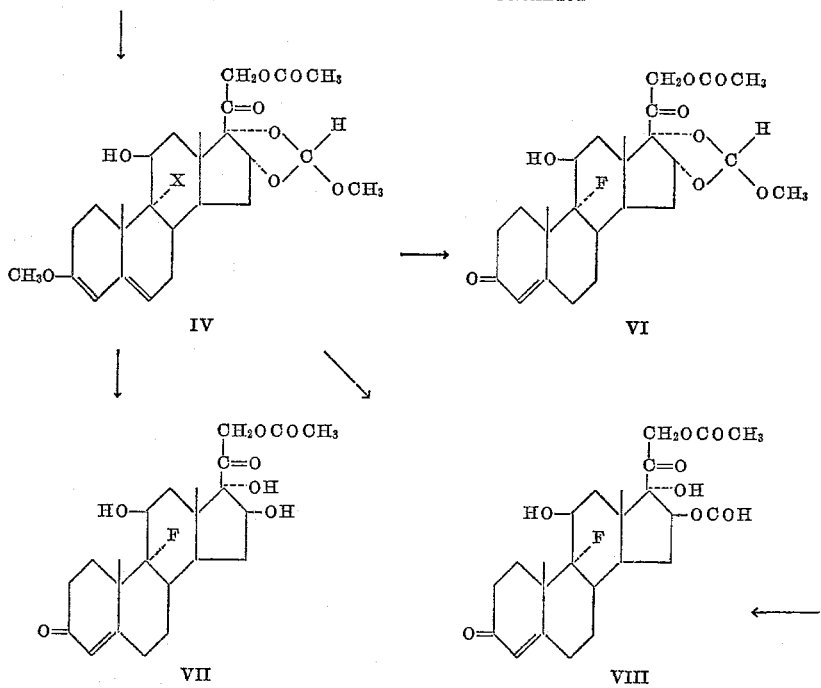

The steroid enol ethers used as starting material in the process of the present invention are described and the process of preparing the same claimed in our copending application Serial No. 122,411, filed July 7, 1961.

The 21 mono esters and 16α mono esters of the steroids prepared by the present process are useful for their anti-inflammatory activity and the longer chain and branch chain esters are longer acting. The present process permits the preparation of other useful steroids such as 16α,21-mixed esters not possible by most methods of esterification.

The following examples describe in detail the process for preparing mono and diesters of the present invention.

EXAMPLE 1

*9α-Fluoro-11β,21-Dihydroxy-16α,17α-Methoxymethylenedioxy-4-Pregnene-3,20-Dione (III)*

To a solution of 0.89 g. of 9α-fluoro-11β,21-dihydroxy-3 - methoxy-16α,17α - methoxymethylenedioxy-3,5 - pregnadien-20-one (II) in 10 ml. of dioxane is added a solution of 0.375 g. of p-toluenesulfonic acid in 2 ml. of dioxane. After standing at room temperature for five minutes the reaction mixture is poured into water and filtered. After several recrystallizations from acetone-petroleum ether, there is obtained 0.16 g. of the product; melting point 222–223° C.; $[\alpha]_D^{25}+139°$ (methanol);

$$\lambda_{max.}^{MeOH} 239 \text{ m}\mu \ (\epsilon \ 16,000)$$

EXAMPLE 2

*21-Acetoxy-9α-Fluoro-11β-Hydroxy-16α,17α-Methoxymethylenedioxy-4-Pregnene-3,20-Dione (VI)*

A solution of 0.6 g. of 21-acetoxy-9α-fluoro-11β-hydroxy-3-methoxy-16α,17α-methoxymethylenedioxy - 3,5 - pregnadien-20-one (IV) in 6.0 ml. of dioxane and 0.6 ml. of water is treated with 2 drops of 70% perchloric acid. After standing for two minutes at room temperature, 0.5 ml. of pyridine is added and the reaction mixture poured into water. The precipitated solid is filtered and dried. Attempts at recrystallization did not give successful results and therefore the compound is dissolved in methylene chloride and chromatographed on a synthetic magnesium silicate adsorbent. The material eluted with the methylene chloride+4% acetone aliquots (4×50 ml.) and the methylene chloride+6% acetone aliquots (3×50 ml.) are combined and recrystallized from ether-petroleum ether to give 0.36 g. of material with a solvated melting point 125–130° C.

$$[\alpha]_D^{25}+192°$$

(methanol);

$$\lambda_{max.}^{MeOH} 239 \text{ m}\mu \ (\epsilon \ 14,700)$$

EXAMPLE 3

*16α-Formyloxy-11β,17α,21-Trihydroxy-4-Pregnene-3,20-Dione (V)*

Three hundred milligrams of 11β,21-dihydroxy-3-methoxy - 16α,17α - methoxymethylenedioxy-3,5-pregnadien-20-one (II) is dissolved in 10 ml. of dioxane. A solution of 0.19 g. of p-toluenesulfonic acid monohydrate in 20 ml. of dioxane is added to the above solution. After five minutes of standing at room temperature, the reaction mixture is poured into water and extracted with ethyl acetate. The ethyl acetate extract is washed with a saturated saline solution and then dried. Evaporation gives a residue which, upon recrystallization from acetone-petroleum ether, gives 0.13 g. of the 16-formate; melting point 200–202° C. Another crystallization raises the melting point to 201–203° C.; $[\alpha]_D^{25}+114°$ (methanol);

$$\lambda_{max.}^{MeOH} 242 \text{ m}\mu \ (\epsilon \ 16,000)$$

EXAMPLE 4

*9α-Fluoro-16α-Formyloxy-11β,17α,21-Trihydroxy-4-Pregnene-3,20-Dione (V)*

One gram of 9α-fluoro-11β,21-dihydroxy-3-methoxy-16α,17α-methoxymethylenedioxy - 3,5 - pregnadien-20-one (II) is dissolved in 30 ml. of methanol and to this solution is added 4.0 ml. of 0.5 N aqueous hydrochloric acid solution. After standing five minutes at room temperature, the solution is poured into water and neutralized with glacial acetic acid. The methanol is partially removed at reduced pressure and the precipitate collected to give 0.5 g. of the formate. Crystallization from acetone gives 0.225 g.; melting point 252–254° C. The melting point is raised to 257–259° C. with a subsequent recrystallization; $[\alpha]_D^{25}+101°$ (methanol);

$$\lambda_{max.}^{MeOH} 239 \text{ m}\mu \ (\epsilon \ 16,300)$$

EXAMPLE 5

*21-Acetoxy-16α-Formyloxy-9α-Fluoro-11β,17α-Dihydroxy-4-Pregnene-3,20-Dione (VIII)*

(A) Eight hundred milligrams of 21-acetoxy-9α-fluoro-11β-hydroxy-3-methoxy-16α,17α - methoxymethylenedioxy-3,5-pregnadien-20-one (IV) is dissolved in 10 ml. of dry dioxane. To this solution is added 0.31 g. of p-toluenesulfonic acid monohydrate in 2.0 ml. of dioxane. After standing at room temperature for five minutes, the reaction mixture is poured into water and filtered. Crystallization of this solid from acetone-petroleum ether gives 0.105 g. of the desired product, melting point 228–235° C. Several more crystallizations raise the melting point to 239–241° C.; $[\alpha]_D^{25} +91.5°$ (chloroform);

$$\lambda_{max.}^{MeOH} \; 239 \; m\mu \; (\epsilon \; 17,000)$$

(B) A solution of 0.11 g. of 9α-fluoro-16α-formyloxy-11β,17α,21-trihydroxy - 4-pregnene-3,20-dione in 1.0 ml. of pyridine and 1.0 ml. of acetic anhydride is prepared. The reaction mixture is allowed to stand at room temperature for 17 hours and then poured into water and filtered. Several recrystallizations of this material from acetone-petroleum ether gives 16-formate-21-acetate, melting point 239–241° C.; $[\alpha]_D^{25}$ +85 (chloroform);

$$\lambda_{max.}^{MeOH} \; 239 \; m\mu \; (\epsilon \; 18,000)$$

The infrared spectrum is identical to that of the product described above.

EXAMPLE 6

*21-Acetoxy-9α-Fluoro-11β,16α,17α-Trihydroxy-4-Pregnene-3,20-Dione (VII)*

A solution of 21-acetoxy-9α-fluoro-11β-hydroxy-3-methoxy - 16α,17α - methoxymethylenedioxy - 3,5-pregnadien-20-one (IV) (0.20 g.) in 10 ml. of methanol is refluxed for ten minutes with 2.5 ml. of a 0.5 N hydrochloric acid solution. Water is then added to the turbidity point and upon cooling there precipitated the desired 21-acetate. After several crystallizations from acetone-petroleum ether 0.10 g. are obtained, melting point 239–241° C.; $[\alpha]_D^{25} +123°$ (methanol);

$$\lambda_{max.}^{MeOH} \; 239 \; m\mu \; (\epsilon \; 16,500)$$

We claim:
1. A method of preparing steroids of the formula:

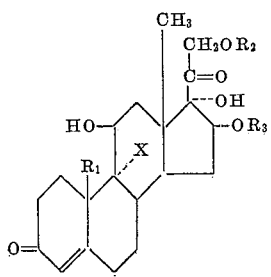

wherein $R_1$ is selected from the group consisting of hydrogen and methyl groups, $R_2$ is selected from the group consisting of hydrogen and lower alkanoyl radicals, $R_3$ is selected from the group consisting of hydrogen, formyl and lower alkanoyl radicals and not more than one of the groups $R_2$ and $R_3$ represent hydrogen and X is selected from the group consisting of hydrogen and halogen atoms which comprises hydrolyzing with acid a steroid of the formula:

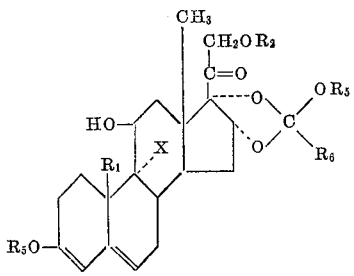

wherein $R_1$, $R_2$ and X are as defined above, $R_5$ is a lower alkyl radical and $R_6$ is selected from the group consisting of hydrogen and lower alkyl radicals, said hydrolysis being carried out in a solvent inert to the reactants in the presence of catalytic amounts of a mineral acid in a period less than 10 minutes.

2. A method of preparing 16α-formyloxy-11β,17α,21-trihydroxy-4-pregnene - 3,20 - dione which comprises hydrolyzing 11β,21-dihydroxy-3-methoxy-16α,17α-methoxymethylenedioxy-3,5-pregnadien-20-one in a solvent inert to the reactants in the presence of p-toluene-sulfonic acid for a period of time less than ten minutes.

3. A method of preparing 9α-fluoro-16α-formyloxy-11β,17α,21-trihydroxy-4-pregnene-3,20-dione which comprises hydrolyzing 9α-fluoro-11β,21-dihydroxy-3-methoxy-16α,17α-methoxymethylenedioxy - 3,5 - pregnadien-20-one in a solvent inert to the reactants in the presence of a catalytic amount of hydrochloric acid for a period of time less than ten minutes.

4. A method of preparing 21-acetoxy-16α-formyloxy-9α-fluoro-11β,17α-dihydroxy-4-pregnene-3,20-dione which comprises hydrolyzing 21-acetoxy-9α-fluoro-11β-hydroxy-3-methoxy-16α,17α-methoxymethylenedioxy - 3,5-pregnadien-20-one in a solvent inert to the reactants in the presence of catalytic amounts of p-toluenesulfonic acid monohydrate for a period of time less than ten minutes.

5. A method of preparing 21-acetoxy-9α-fluoro-11β,16α,17α-trihydroxy-4-pregnene - 3,20 - dione which comprises hydrolyzing 21-acetoxy-9α-fluoro - 11β - hydroxy-3-methoxy - 16α,17α - methoxymethylenedioxy - 3,5-pregnadien-20-one in a solvent inert to the reactants in the presence of catalytic amounts of hydrochloric acid for a period of time less than ten minutes.

No references cited.